United States Patent
Klaassen et al.

(10) Patent No.: US 11,848,468 B2
(45) Date of Patent: Dec. 19, 2023

(54) LIQUID CARBON-NEUTRAL ENERGY FACILITY SYSTEM

(71) Applicant: The Claire Technologies Corporation, Danville, CA (US)

(72) Inventors: Alan W Klaassen, Kensington, CA (US); Curtis L. Munson, Oakland, CA (US); Steven F. Sciamanna, Orinda, CA (US); Paul A. Allinson, Danville, CA (US)

(73) Assignee: Claire Technologies, Danville, CA (US)

( * ) Notice: Subject to any disclaimer, the term of this patent is extended or adjusted under 35 U.S.C. 154(b) by 56 days.

(21) Appl. No.: 17/684,118

(22) Filed: Mar. 1, 2022

(65) Prior Publication Data

US 2022/0285714 A1    Sep. 8, 2022

Related U.S. Application Data

(60) Provisional application No. 63/155,741, filed on Mar. 3, 2021.

(30) Foreign Application Priority Data

Sep. 29, 2021  (WO) ................ PCT/US2021/052553
Oct. 9, 2021    (WO) ................ PCT/US2021/054323

(51) Int. Cl.
  *C10G 45/00*  (2006.01)
  *C10G 45/44*  (2006.01)
  (Continued)

(52) U.S. Cl.
  CPC .......... *H01M 8/0656* (2013.01); *C10G 45/00* (2013.01); *H01M 8/04201* (2013.01);
  (Continued)

(58) Field of Classification Search
  CPC .... C10G 2300/1014; C10G 2300/1033; C10G 69/04; C10G 2300/1037; C10G 2300/301;
  (Continued)

(56) References Cited

U.S. PATENT DOCUMENTS

| | | |
|---|---|---|
| 4,567,033 A | 1/1986 | Kesten |
| 7,045,230 B2 | 5/2006 | Rusta-Sellehy |

(Continued)

FOREIGN PATENT DOCUMENTS

| | | |
|---|---|---|
| CN | 106542955 A | 3/2017 |
| DE | 102014006430 A1 | 11/2015 |

(Continued)

OTHER PUBLICATIONS

Materials Article: Hydrogen Production from the LOHC Perhydro-Dibenzyl-Toluene and Purfication Using a 5 um PdAg-Membrane in a Coupled Microstructured System; Alexander Wunsch, Tatjana Berg, and Peter Pfeifer.

(Continued)

*Primary Examiner* — Ellen M Mcavoy
*Assistant Examiner* — Chantel Graham
(74) *Attorney, Agent, or Firm* — Peter Tormey; A, T & P PC

(57) ABSTRACT

This present disclosure relates generally to a liquid carbon-neutral energy facility (CNEF) operating as a system and the associated apparatus, methods and processes (methodology) for the generation of Carbon-Neutral Hydrogen (CNH) and Carbon-Neutral Electricity (CNE) in a new facility or alternatively in association with an existing greenfield, oil/gas field, or wholly or partially converted oil refinery and the like, and further relating to the generation and storage of energy and/or electricity by means of chemical potential energy operating as a liquid battery using Liquid Organic Hydrogen Carrier (LOHC) compositions.

14 Claims, 6 Drawing Sheets

(51) Int. Cl.
*H01M 8/0656* (2016.01)
*H01M 8/0612* (2016.01)
*H01M 8/0668* (2016.01)
*H01M 8/04082* (2016.01)

(52) U.S. Cl.
CPC ....... *H01M 8/0643* (2013.01); *H01M 8/0668* (2013.01); *C10G 45/44* (2013.01)

(58) Field of Classification Search
CPC ......... C10G 45/00; C10G 45/44; Y02E 60/50; H01M 8/04022; H01M 8/04201; H01M 8/0606; H01M 8/0625; H01M 8/0643; H01M 8/0656; H01M 8/0668; Y02P 30/00; Y02P 30/20
See application file for complete search history.

(56) References Cited

U.S. PATENT DOCUMENTS

| | | | |
|---|---|---|---|
| 7,261,961 | B2 | 8/2007 | Kamachi et al. |
| 7,485,161 | B2 | 2/2009 | Toseland et al. |
| 10,396,388 | B2 | 8/2019 | Andres et al. |
| 10,793,000 | B2 | 10/2020 | Kondo |
| 2009/0246575 | A1 | 10/2009 | Zhao et al. |
| 2010/0151292 | A1 | 6/2010 | Frick et al. |
| 2011/0003218 | A1 | 1/2011 | Stolte et al. |
| 2012/0180554 | A1 | 7/2012 | Leggett et al. |
| 2013/0305598 | A1 | 11/2013 | Hamilton et al. |
| 2016/0214858 | A1* | 7/2016 | Cooper .................... C01B 3/26 |
| 2016/0301093 | A1* | 10/2016 | Bosmann .......... H01M 8/04201 |
| 2018/0053957 | A1 | 2/2018 | Pez et al. |
| 2018/0290117 | A1 | 10/2018 | Rathke et al. |
| 2019/0292048 | A1 | 9/2019 | Kusche et al. |
| 2019/0309904 | A1 | 10/2019 | Kusche et al. |
| 2020/0071619 | A1 | 3/2020 | Humphreys et al. |
| 2020/0235414 | A1 | 7/2020 | Teichmann et al. |

FOREIGN PATENT DOCUMENTS

| | | | |
|---|---|---|---|
| WO | WO-2019211300 A1 * | 11/2019 | ............. C01B 3/001 |
| WO | WO-2020018972 A1 * | 1/2020 | ........... C01B 3/0015 |

OTHER PUBLICATIONS

Energies Review: Potential Liquid-Organic Hydrogen Carrier (LOHC) Systems: A Review on Recent Progress; Pruna Chandra Rao and Minyuoung Yoon.

\* cited by examiner

LIQUID CARBON-NEUTRAL ENERGY FACILITY SYSTEM

PRIORITY

This application claims the benefit of the priority of U.S. provisional patent application Ser. No. 63/155,741, entitled "A Carbon-Neutral Energy Facility (CNEF) Business Method", filed on Mar. 3, 2021; the benefit of the priority of U.S. utility patent application Ser. No. 17/497,903, entitled "Carbon-Neutral Process for Generating Electricity", filed on Oct. 9, 2021; the benefit of the priority of International utility patent application Serial No. PCT/US2021/0543233, entitled "Carbon-Neutral Process for Generating Electricity", filed on Oct. 9, 2021; the benefit of the priority of U.S. provisional patent application Ser. No. 63/091,425, entitled "Carbon-Neutral Process for Generating Electricity", filed on Oct. 14, 2020; the benefit of the priority of U.S. utility patent application Ser. No. 17/488,867, entitled "Carbon-Neutral Process for Generating Electricity", filed on Sep. 29, 2021; the benefit of the priority of International utility patent application Serial No. PCT/US2021/052553, entitled "Carbon-Neutral Process for Generating Electricity", filed on Sep. 29, 2021; and the benefit of the priority of U.S. provisional patent application Ser. No. 63/088,024, entitled "Carbon-Neutral Process for Generating Electricity", filed on Oct. 6, 2020; all of which are hereby incorporated in their entirety by reference herein.

FIELD

This present disclosure relates generally to a liquid carbon-neutral energy facility (CNEF) operating as a system and the associated apparatus, methods and processes (methodology) for the generation of Carbon-Neutral Hydrogen (CNH) and Carbon-Neutral Electricity (CNE) in a new facility or alternatively in association with an existing greenfield, oil/gas field, or wholly or partially converted oil refinery and the like, and further relating to the generation and storage of energy and/or electricity by means of chemical potential energy operating as a liquid battery.

The liquid CNEF system and associated methodology disclosed herein describe various embodiments which utilize Carbon Neutral Hydrogen (CNH) supplied by Reversible Solid Oxide Fuel Cells (Reversible SOFCs or R-SOFC), operating as electrolyzers, PEME (Proton Exchange Membrane Electrolyzers), or Steam Methane Reformers (SMRs) with carbon to generate CNH which is then used to hydrogenate a hydrocarbon to form a stable enriched or Regenerated Liquid Organic Hydrocarbon Carrier (R-LOHC) which is stable at ambient conditions, thus acting essentially as a liquid battery for the storage of chemical potential energy. The R-LOHC is stored in conventional oil tanks and used to supply external, fixed or mobile markets, or used as a grid-scale liquid energy storage battery. The R-LOHC may be used in three modes: 1) with or without dehydrogenation as a carbon neutral (CN) fuel for use in internal combustion engines (ICE), gas turbines (GT) and furnaces; 2) post dehydrogenation, on external mobile and/or fixed equipment to liberate hydrogen gas for use in proton exchange membrane fuel cells (PEMFC), and: 3) post dehydrogenation for use in SOFCs. The Spent LOHC (S-LOHC) is returned to the CNEF for hydrogen reloading. At the CNEF a dehydrogenation facility releases the hydrogen from the R-LOHC for use by the R-SOFCs running in fuel cell mode to generate electricity for use on the electrical grid. Embodiments of the CNEF system as disclosed herein allows a means for existing refineries to be fully or partially converted to facilities that utilize carbon-neutral excess power from the grid to convert S-LOHC into R-LOHC which is used to supply CNH to customers or at the CNEF site to generate CNE for the grid during periods of demand. Very large-scale liquid batteries can be constructed in repurposed oil refineries, for example a 500,000-barrel oil tank can store the equivalent of 60 GWh (gigawatt-hours) of energy.

BACKGROUND

Systems employing traditional battery storage means to supply electricity are known and readily available. However large energy storage systems that depend exclusively on batteries are limited in energy storage capacity, operating time by the extended battery recharging time required. This present disclosure describes multiple embodiments for the creation of a technology enabled apparatus, methods, facilities and processes that can store and liberate carbon-neutral electricity on a significant scale (e.g. GW-days) utilizing existing equipment and storage tankage common to oil refineries, petrochemical plants and current distribution pipelines terminals and point of sale facilities, employing the use of liquid organic hydrogen carriers in a liquid battery system.

Systems utilizing electrolyzers for the generation of power are known and readily available but they do not generate revenue or profit when in standby mode. Systems utilizing fuel cells for the generation of power are known and readily available but they do not generate revenue or profit unless they are making electricity. Systems for storing hydrogen are known and readily available but generally require high pressure compression in the 10,000 psig (pounds per square inch in gauge) region for storage and use in fuel cells.

This new methodology and associated apparatus and processes as described herein combines R-SOFCs with hydrogenation and dehydrogenation facilities and existing storage tankage to create a flexible carbon-neutral import-storage-export facility that optimizes the conversion of excess electricity into hydrogen which is stored at ambient temperature and pressure and later released for the generation of carbon-neutral electricity on-site or in a distributed manner.

The methodology and associated technology disclosed herein optimizes the use of new and existing capital equipment in a novel and efficient configuration. During periods of excess electricity, the solid oxide fuel cells operate as electrolyzers splitting water into oxygen and hydrogen. During periods of electrical deficit, they operate in reverse converting hydrogen, released from the R-LOHC by dehydrogenating equipment into carbon-neutral electricity.

Another example of capital efficiency in the methods disclosed herein includes the recycling of S-LOHC into R-LOHC during periods of excess electricity. The decoupling of electrical generation and hydrogen generation allows embodiments of the innovative CNEF system to optimize its economics by purchasing low priced electricity during periods of excess and selling it back during high demand. The balance of the time is used to generate and reprocess LOHC for wider geographic use.

The new methodology described herein in various embodiments also enables improved energy conservation. When the R-SOFCs are operating in fuel cell mode generating electricity they are highly exothermic and the heat generated is used to supply the endothermic dehydrogenation reaction which liberates hydrogen from R-LOHC.

When the R-SOFCs are operating in endothermic electrolyzer mode generating hydrogen gas to supply the hydrogenation units which are exothermic in nature, excess heat generated by the hydrogenation reaction is used to reduce the R-SOCF energy demand. This intelligent R-SOFC mode-based energy-coupling increases the efficiency of the overall process significantly.

Water conservation is enabled by the herein disclosed methodology and associated apparatus and technology which captures near potable water from the R-SOFC's in fuel cell mode and stores the water for reuse in electrolyzer mode, which is water deficient.

Grid stability is a concern today and conventional batteries are only able to supply short duration back-up needs, typically four hours maximum. Facilities using embodiments of the disclosed apparatus and technical methods described herein will enable utilities to expand their use of solar and photovoltaic (PV), wind and other renewable energy sources because the embodiments of the liquid battery storage systems disclosed herein have potential capacities of orders of magnitude greater than competitive systems, enabling GW-days or weeks of electrical backup.

In addition to green hydrogen generation by electrolysis, embodiments of the CNEF system as disclosed herein enable blue hydrogen, created by gasification and/or reforming, to be used with carbon capture and sequestration. In this way natural gas, heavier hydrocarbons and even plastic recycling can be used to convert S-LOHC to R-LOHC by means of the disclosed embodiments herein.

In some applications the disclosed methodology herein addresses the needs of auxiliary combustion and R-LOHC can be created with a portion being bio-derived. The CNEF system as disclosed herein has been designed to incorporate business relationships with bio-aromatic suppliers utilizing the CNEF equipment to create a bio-derived R-LOHC to meet these needs.

The CNEF system and associated methodology includes connectivity to pipeline companies, trucking fleets, distributors and retail outlets. Existing external facilities can be easily modified to handle the R-LOHC and S-LOHC material, enabling a cost-effective pathway to enabling society to transit to a carbon-neutral future.

SUMMARY

In one aspect, the present disclosure describes various embodiments of a Carbon-Neutral Energy Facility (CNEF) system for the generation of Carbon-Neutral Hydrogen (CNH) and Carbon-Neutral Electricity (CNE) in a new facility or existing greenfield, oil/gas field, or wholly or partially converted oil refinery, and the like.

In one aspect, the present disclosure describes various embodiments of methods for reconfiguring or repurposing an existing refinery or other facility into a CNEF system in order to rehydrogenate a Spent Liquid Organic Hydrogen Carrier (S-LOHC) into a Regenerated Liquid Organic Hydrogen Carrier (R-LOHC) for multiple uses including very large-scale storage batteries. The generation of carbon-neutral hydrogen may be conducted by electrolysis in Reversible Solid Oxide Fuel Cells (R-SOFC) using excess power from the grid. Alternatively, the generation of carbon-neutral hydrogen may be conducted by steam reforming of hydrocarbons using Carbon Capture Sequestration and Usage (CCSU). Alternatively, the generation of carbon-neutral hydrogen may be conducted by gasification of biomass, or by gasification of plastics with CCSU. In one embodiment, hydrogen used in rehydrogenating the S-LOHC is externally generated green/blue hydrogen, including renewable green sources such as photovoltaic processes, wind capture process, etc. In another embodiment, the hydrogen is from externally generated carbon-neutral blue sources such as steam methane reforming with CCSU.

In another aspect the present disclosure describes various embodiments of means to provide storage of a R-LOHC in a CNEF system or CN refinery storage tank for supplying external markets for trucks, ships, etc., and supplying a grid scale energy storage liquid battery.

In yet another aspect, the present disclosure describes various embodiments of methods for the dehydrogenation of R-LOHC in a CNEF system, refinery or similar facility to create hydrogen for use in an R-SOFC to supply an electrical grid.

In another aspect, the present disclosure describes various embodiments of means to provide for the distribution from the CNEF of R-LOHC to at least one of filling stations for use in heavy-duty trucks and machinery, power ships and trains initially and aircraft at a later date, and end users for local energy back-up using the R-LOHC in any of three modes, including for 1) internal combustion engines (ICE), gas turbines (GT) and furnaces; 2) post dehydrogenation, on external mobile and/or fixed equipment to liberate hydrogen gas for use in proton exchange membrane fuel cells (PEMFC), and: 3) post dehydrogenation for use in SOFCs In another aspect, the present disclosure describes various embodiments of means to provide for the collection of S-LOHC and its return to the CNEF system for hydrogenation to R-LOHC.

In another aspect, the present disclosure describes various embodiments of methods for purchasing excess electricity at low rates for use in reversible R-SOFCs to generate hydrogen for the conversion of S-LOHC into R-LOHC.

In another aspect, the present disclosure describes various embodiments of means to provide for storage of the converted R-LOHC for supplying the reversible R-SOFCs with hydrogen to create power when needed during times of deficit.

In another aspect, the present disclosure describes various embodiments of means to enable the production of bio-derived R-LOHC that can be combusted by users in special circumstances, such as aircraft take-off and climb without incurring a greenhouse gas (GHG) penalty.

In another aspect, the present disclosure describes various embodiments of means for the integration of systems such as waste heat, water recovery and oxygen/nitrogen from the R-SOFC streams.

In yet another aspect, the present disclosure describes various embodiments of means to enable the installation of an energy conservation management system to permit the efficient transfer of power from and during import to export mode; to optimize heat transfer between exothermic and endothermic equipment based on their current operating mode; and to conserve, capture, and reuse water during and in transition between facility operating modes.

In a further aspect, the present disclosure describes various embodiments of apparatus, methods and processing for converting the operation of a whole or partially converted oil refinery into a carbon-neutral energy facility or CNEF system as described by the various embodiments disclosed herein.

GLOSSARY

Figure 1:
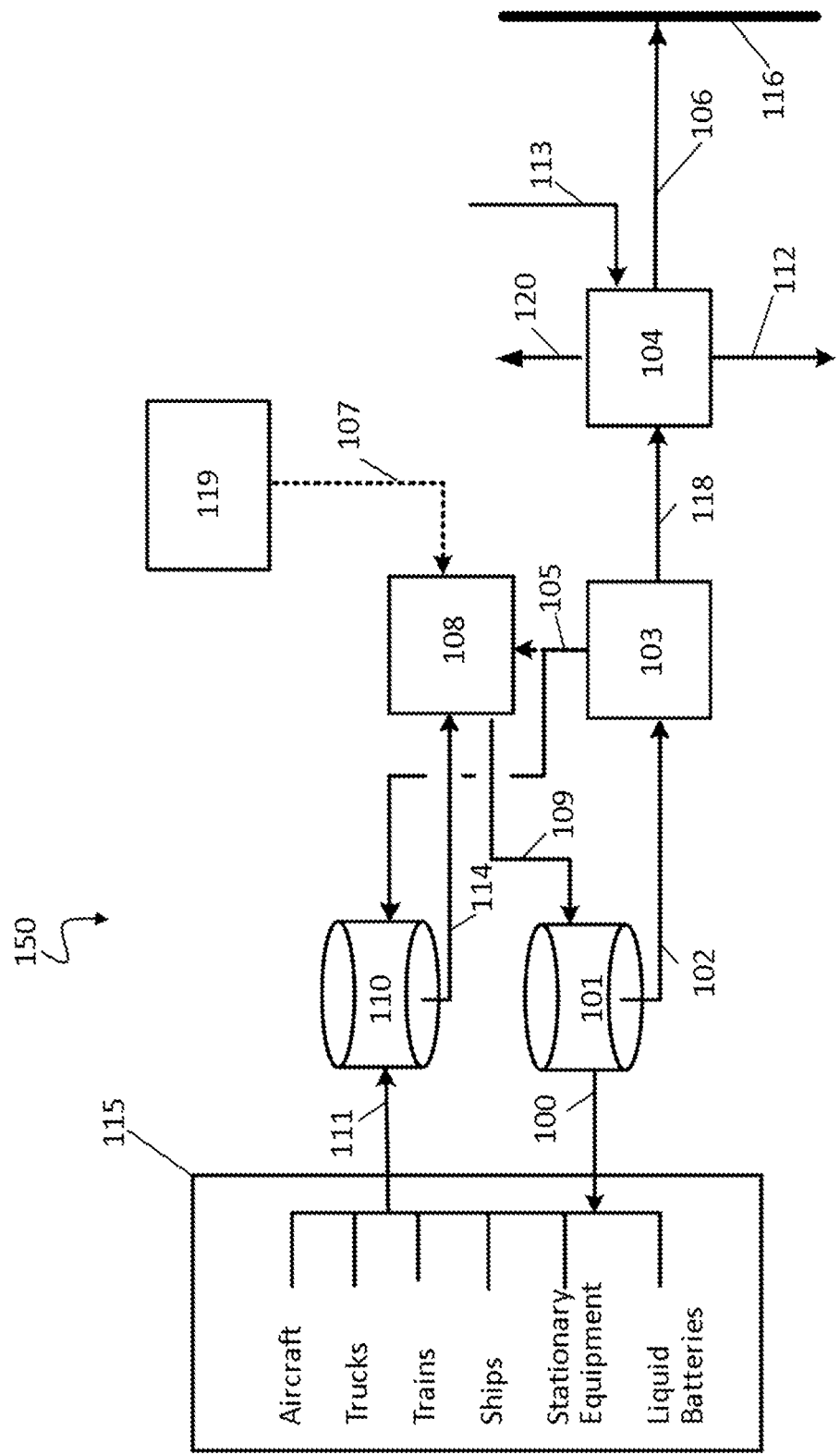
FIG. 1 illustrates a schematic of a carbon-neutral energy facility and processes to operate the system in a power generation mode.

As used herein, "liquid organic hydrogen carrier" or "LOHC" refers to a hydrogenated organic substrate selected from monocyclic, polycyclic, heterocyclic and homocyclic organic compounds that can be processed to release chemically bound hydrogen via dehydrogenation and are liquid at standard temperature and pressure (STP, 0° C., 1 bar).

As used herein, the term "R-LOHC" refers to a regenerated or hydrogen-enriched, fully or at least partially hydrogenated form of the liquid organic hydrogen carrier. The R-LOHC may be, in sequential process steps, dehydrogenated to remove at least a portion of the hydrogen atoms contained in the carrier, and rehydrogenated to replace at least a portion of the removed hydrogen atoms.

As used herein, the term "S-LOHC" refers to a spent or hydrogen-deficient, at least partially dehydrogenated form of the liquid organic hydrogen carrier.

As used herein, the term "recycle" or "recyclable" used in conjunction with LOHC refers to LOHC material that, when at least partially used or spent, is capable of being converted to enriched or regenerated LOHC for further use or storage.

As used herein, the term "labile hydrogen" refers to the portion of chemically bound hydrogen in a hydrogenated LOHC that may be reversibly removed by dehydrogenation, and subsequently reversibly replaced by a following hydrogenation reaction.

As used herein, the term "recyclable LOHC" refers to an LOHC having the capability of being reversibly hydrogenated to form R-LOHC, and then reversibly dehydrogenated to form S-LOHC, in a multiply cyclic process.

As used herein, the related terms "CN component," "first CN component," "second CN component" and "secondary CN component" refers to liquid compounds containing carbon-neutral carbon that may be added to the LOHC feed at various stages in the disclosed methods and processes in sufficient amounts to at least equal the quantity of carbon atoms being exhausted during an energy generation process. The exhausted carbon atoms may include vented hydrocarbons and/or vented carbon oxides. The carbon in these "CN components" is termed as "carbon-neutral carbon" by reason of its origin from carbon compounds that are captured from the atmosphere or from flue gas that is being vented to the atmosphere, including carbon dioxide ($CO_2$).

Unless otherwise indicated, the acronym "CNEF" is intended to refer to carbon-neutral energy facility and associated systems including the apparatus, equipment, tanks, piping, valves and the like, and associated methods and processes employing the physical aspects of a facility.

Unless otherwise indicated, the acronym "MCH" is intended to refer to methylcyclohexane.

Unless otherwise indicated, the acronym "BTX" is intended to refer to a mixture of benzene, toluene, and xylene, in any ratio.

Unless otherwise indicated, the acronym "GHG" is intended to refer to a greenhouse gas found in the earth's atmosphere that may absorb and emit radiant energy within the thermal infrared range.

Unless otherwise indicated, the term "CN" is intended to refer to "carbon-neutral" compositions, processes and apparatus employing these compositions. The process of generating hydrogen from a blended LOHC feed and of generating electricity from the generated hydrogen is termed as "carbon-neutral" by reason of the purposeful addition of the CN component containing carbon-neutral carbon to the LOHC feed in sufficient amount to at least equal the number of carbon atoms being exhausted during the electrical generation process, including vented hydrocarbons and vented carbon oxides.

Unless otherwise indicated, the term "carbon-neutral carbon" or "CNC" further includes carbon compounds that are captured from the atmosphere, including carbon oxides, and from combustion processes and from flue gas emissions that would otherwise persist or be released into the atmosphere.

As used herein, the terms "wt %" and "weight %" as used here is equivalent to "percent by weight."

As used herein, the term "bi-modal" refers to the ability of the blended LOHC to carry labile hydrogen for release in a dehydrogenation device and the ability for the CN component contained in the LOHC to be combusted without attracting carbon penalties.

As used herein, the term "unloaded hydrogen carrier" refers to a hydrocarbon having the capacity to capture chemically bound hydrogen in a catalytic hydrogenation process. An unloaded hydrogen carrier may be a single or double ring aromatic, such as benzene, toluene or decalin. In some circumstances, the unloaded hydrogen carrier may further comprise one or more partially hydrogenated carriers such as for example, but not limited to a cyclohexene and cyclohexadiene pair, or the corresponding partially hydrogenated analogs of toluene and decalin. Suitable hydrocarbons include alkyl and aromatic compounds of between C6 to C12 content.

DETAILED DESCRIPTION

One embodiment of the present disclosure is a CNEF system operating in a "Hydrogen Generation Mode" that may provide R-LOHC to customers for vehicle operation and/or for customers' stand-alone operation (e.g. building electrical supply, hydrogen supply, battery charging, and the like.) Embodiments disclosed herein include methods and processes for providing R-LOHC to customers containing an added secondary CN component for CN operation at customer facilities, and correspondingly receiving "spent" or S-LOHC from customers for eventual regeneration and re-use. In another embodiment, the CNEF system may alternatively be employed to generate CN hydrogen gas for providing to customers utilizing hydrogen-fueled equipment, vehicles and processes.

In further embodiments of the present disclosure, the CNEF system is employed to hydrogenate S-LOHC to regenerate the R-LOHC for delivery to customers.

Losses will naturally occur in the CNEF system, such as for example undesirable byproducts during the disclosed de/re-hydrogenation processes, bleed streams vented to atmosphere to maintain the integrity of hydrogen that is internally recycled during CNEF operation, hydrocarbon combustion to maintain dehydrogenation temperature, and the like. Accordingly, various embodiments disclosed herein provide a means to account for losses by using additional bioderived and carbon-neutral components, thus ensuring that any LOHC loss or carbon dioxide escape to atmosphere during operation of the CNEF system is balanced so as to provide for an overall carbon-neutral operation. The embodied methods and processes of the present disclosure include multiple suitable sources of hydrogen gas for hydrogenation including: (i) "green hydrogen" derived from photovoltaic electrolysis, wind electrolysis, biomass gasification and the like; (ii) "blue hydrogen" derived from processes associated with CCSU (Carbon Capture Sequestration and Usage); and "clean hydrogen" derived from nuclear powered electrolysis of water.

Further embodiments of the present disclosure include a CNEF system operating in a "Power Generation Mode" that may generate hydrogen gas by dehydrogenation of stored R-LOHC or alternatively convert generated hydrogen electrochemically in a fuel cell to generate electricity to supply to the utility grid, particularly when there is a deficit of available electricity or the relative cost of available electricity form the grid exceeds the cost of electricity production by the CNEF system.

Yet further embodiments of the present disclosure include methods and processes that enable the CNEF system and CN storage system as described herein to function effectively as a recycle system to regenerate LOHC from S-LOHC sources and LOHC sources augmented with added secondary CN components. In related embodiments, carbon loss to the atmosphere may be offset by adding a secondary CN component to the (i) R-LOHC material in any disclosed process step; (ii) to R-LOHC contained within an R-LOHC storage tank; and (iii) while feeding R-LOHC to a dehydrogenation reactor.

In other embodiments, the CNEF system employs fuel cells for the production of electrical energy, including for example but not limited to PEMFC (proton exchange membrane fuel cell) that operate at temperatures below the typical dehydrogenation temperature. In embodiments employing PEMFC devices, there are limited heat exchange opportunities, so their use may require an additional combustion step to maintain thermal balance in the CNEF system.

In related alternative embodiments, a PEMFC device may be operating in electrolyzer mode to generate hydrogen and oxygen gas when excess electrical energy is available from the utility grid or internally generated electricity is available from within the CNEF system.

In yet further related embodiments an SOFC (solid oxide fuel cell) may be employed in the disclosed CNEF system. These cells typically operate at temperatures up to 1000° C. When operated at the higher temperature limits, these cells may not be capable of providing significant heat exchange with a dehydrogenation reactor using liquid heat transfer fluids and associated heat exchange apparatus and methods. Accordingly, a newer generation of SOFC that operate at lower temperatures are better employed for use herein, particularly for example, but not limited to SOFC that operate at temperatures below about 600° C. during operation. These newer SOFC provide the opportunity for substantial heat exchange with a dehydrogenation reactor and thus are more effective at maintaining thermal balance within the CNEF system.

In further related embodiments, both traditional and newer SOFCs may be operated reversibly, so as to provide a means for the CNEF systems disclosed herein to generate electricity for direct use or power water electrolysis to generate hydrogen gas (and oxygen) for internal or external use.

In a more detailed embodiment, the disclosed apparatus and processes describe a method of operating a Carbon Neutral Energy Facility (CNEF) system to provide a carbon captured fossil fuel or renewable energy source in the form of a carbon neutral (CN) Liquid Organic Hydrocarbon composition (LOHC) comprising the steps of first generating a hydrogenated LOHC composition (R-LOHC) using a source of carbon neutral (CN) hydrogen from a fossil fuel source or carbon neutral (CN) hydrogen gas derived from carbon neutral (CN) electrical energy obtained from a renewable resource, and using a source of electricity obtained from an electrical utility grid; wherein the source of the LOHC is a partially or fully dehydrogenated LOHC (S-LOHC); then providing the R-LOHC to at least one customer; then receiving the S-LOHC from the customer; then regenerating the S-LOHC received from the customer by further hydrogenation of the S-LOHC into the R-LOHC by using a hydrogenation unit powered by the CN electrical energy or by means of the CN hydrogen; wherein the source of hydrogen gas is either generated internally to the CNEF system or obtained from the renewable resource; and then storing the R-LOHC for either internal use within the CNEF system or for redistribution to a customer.

In another embodiment, the disclosed apparatus and processes describe a method of operating a Carbon Neutral Energy Facility (CNEF) system wherein the R-LOHC contains an added secondary carbon-neutral (CN) component; and wherein the secondary CN component is derived from a carbon-neutral carbon (CNC) sourced material.

In yet another embodiment, the fossil fuel source includes natural gas obtained by means of a Carbon Capture Sequestration and Usage (CCSU) process, while alternatively the renewable resource is selected from biomass gasification, photosynthesis, green hydrogen, blue hydrogen and combinations thereof; wherein the green hydrogen gas is generated using CN electrical energy obtained from geothermal, hydroelectric, nuclear, photovoltaic, solar, wave, and wind power and combinations thereof; wherein the blue hydrogen gas is obtained by means of a Carbon Capture Sequestration and Usage (CCSU) process; and wherein the CN electrical energy is obtained from an electrical source using geothermal, hydroelectric, nuclear, photovoltaic, solar, wave, and wind power, and combinations thereof.

In a further embodiment, the hydrogen gas may be generated internally by means of a SMR (steam-methane reformer) unit operating on a supply of natural gas; and wherein the natural gas is derived from biomass.

In further embodiments, any of the disclosed process herein where any loss of electricity or heat due to any internal process occurs, such loss may be offset by the use of a CN electrical energy; and wherein the CN component further includes any source of carbon-neutral carbon (CNC) that may be added to an LOHC feed during any process step in an amount sufficient to at least equal the quantity of carbon atoms being exhausted during an energy generation process.

In a further related embodiments, any of the disclosed process herein where any loss of carbon dioxide to the environment occurs, such may be offset by the addition of the secondary CN component in an amount sufficient to equal the amount of carbon content loss to the environment.

In yet another embodiment, the present disclosure describes a method of operating a Carbon Neutral Energy Facility (CNEF) system to produce a carbon neutral (CN) fuel in the form of carbon neutral (CN) hydrogen gas for distribution to a customer for use as a CN fuel in the following applications selected from an internal combustion engine, gas turbine, electrolysis cell, fuel cell, and combinations thereof; wherein the CN hydrogen gas is produced by means of using a carbon neutral carbon (CNC) content material, CN electricity derived from either an internal source within the CNEF system or from CN electricity derived from a utility grid.

In a related embodiment, the CN hydrogen gas may be mixed with other sources of CN fuel; wherein the CN hydrogen gas may be combined with an added secondary carbon neutral (CN) component for use in an electrolysis cell or a fuel cell; wherein the fuel cell is selected from a reversible fuel cell, PEMEC (proton-exchange membrane electrolysis cell), reversible PEMFC (proton-exchange membrane fuel cell), SOFC (solid oxide fuel cell), SOEC (solid oxide exchange cell), dual purpose proton-exchange membrane (PEC), alkaline fuel cell (AFC), phosphoric acid fuel cell (PAFC), molten carbonate fuel cell (MCFC), solid oxide fuel cell (SOFC), ceramic oxide fuel cell, and combinations thereof.

In a further related embodiment, the reversable fuel cell may utilize the CN hydrogen gas to generate carbon neutral (CN) electrical energy.

Yet another embodiment of the present disclosure is a method of operating a Carbon Neutral Energy Facility (CNEF) system to provide a renewable energy source in the form of internally generated carbon neutral (CN) electrical energy, comprising the steps of employing a carbon neutral (CN) Liquid Organic Hydrocarbon composition (LOHC) comprising hydrogenated LOHC composition (R-LOHC); then generating hydrogen gas by dehydrogenation of the R-LOHC using a hydrogen production unit; and then converting the generated hydrogen gas electrochemically in an electrolysis cell to generate the CN electrical energy and produce a partially or fully dehydrogenated LOHC (S-LOHC); wherein the electrolysis cell is selected from a reversible fuel cell, PEMEC (proton-exchange membrane electrolysis cell), reversible PEMFC (proton-exchange membrane fuel cell), SOFC (solid oxide fuel cell), SOEC (solid oxide exchange cell), dual purpose proton-exchange membrane (PEC), alkaline fuel cell (AFC), phosphoric acid fuel cell (PAFC), molten carbonate fuel cell (MCFC), solid oxide fuel cell (SOFC), ceramic oxide fuel cell, and combinations thereof; and finally transferring at least a portion of the CN electrical energy to a utility power grid.

In a related embodiment, the CN electrical energy is used to generate an electrical credit, a greenhouse gas credit, carbon energy credit, or combination thereof.

In a further related embodiment, the hydrogen production unit is selected from a catalytic dehydrogenation unit, a reversible fuel cell, and combinations thereof.

In yet another related embodiment, any loss of carbon dioxide to the environment is offset by the addition of the secondary CN component to the R-LOHC in an amount sufficient to equal the carbon content loss to the environment; and any loss of electricity and heat due to any internal process is offset by the use of a CN electrical energy source.

In yet a further related embodiment, a portion of the internally generated CN electrical energy is used to recharge a carbon-neutral (CN) storage system in the form of a liquid battery consisting of R-LOHC generated by conversion of S-LOHC using internally generated CN electrical energy.

An additional embodiment of the present disclosure is a method of operating a Carbon Neutral Energy Facility (CNEF) system to provide a renewable energy source in the form of internally generated carbon neutral (CN) hydrogen gas comprising the steps of employing a carbon neutral (CN) Liquid Organic Hydrocarbon composition (LOHC) that is interconvertible between a hydrogenated LOHC composition (R-LOHC) and a partially or fully dehydrogenated LOHC composition (S-LOHC); converting a portion of stored R-LOHC into S-LOHC with a fuel cell (FC) using a source of carbon neutral (CN) electricity to simultaneous generate CN hydrogen gas; wherein the fuel cell is operated in reverse mode or electrolyzer mode to hydrolyze water; wherein the source of CN electrical energy is obtained from geothermal, hydroelectric, nuclear, photovoltaic, solar, wave, and wind power and combinations thereof; then storing the CN hydrogen gas for use internally or for transfer to a customer for use as a fuel in a hydrogen gas powered device selected from an internal combustion engine (ICE), gas turbine (GT), furnace, PEMF fuel cell, SOFC fuel cell, power generator, turbine, and the like, or alternatively for use in an industrial application to produce CN electricity with a reduced or carbon-neutral environmental footprint.

In a further related embodiment to that above, an additional process step uses a combustor to combust at least a portion of the CN hydrogen gas to generate heat while capturing at least a portion of the heat of combustion of the CN hydrogen gas by means of a heat exchanger to provide energy to the fuel cell to provide for the overall CN generation of the CN hydrogen gas.

Specific embodiments of the present disclosure follow with the aid of figures to better illustrate the apparatus, methods and processes enabled by the CNEF system and CN storage systems contemplated herein.

CNEF System in Power Generation Mode

According to the embodiment illustrated in FIG. 1, a CNEF system 150 as disclosed herein can be operated in a power generation mode, the methodology providing electricity when there is a supply or excess of enriched or regenerated R-LOHC available, thus acting as a means of energy generation in the form of a liquid battery.

In the embodiment shown in FIG. 1, R-LOHC 102 (regenerated LOHC) from R-LOHC storage tank 101 is dehydrogenated in hydrogen production unit 103 to release hydrogen gas 118 for use in a R-SOFC 104 fuel cell operating in Power Generation mode delivering (output) electricity 106 to the utility grid 116.

In this and related embodiments, the CNEF system 150 is put into operation when a hydrogen source is available to regenerate a source of S-LOHC into R-LOHC for storage, transfer or use in generating electricity.

Air 113 is supplied to the cathode side of R-SOFC 104 and water 112 generated in 104 is condensed and routed to storage and reuse. Oxygen or an oxygen enriched gas 120 is exhausted concurrently while the fuel cell is in operation.

The Spent LOHC (S-LOHC) 105 internal recycle material from unit 103 and externally sourced recycle S-LOHC 111 flows to S-LOHC storage tank 110 for later processing by hydrogenation of spent S-LOHC into R-LOHC within the hydrogenation unit 108 via supply stream 114.

Figure 2:
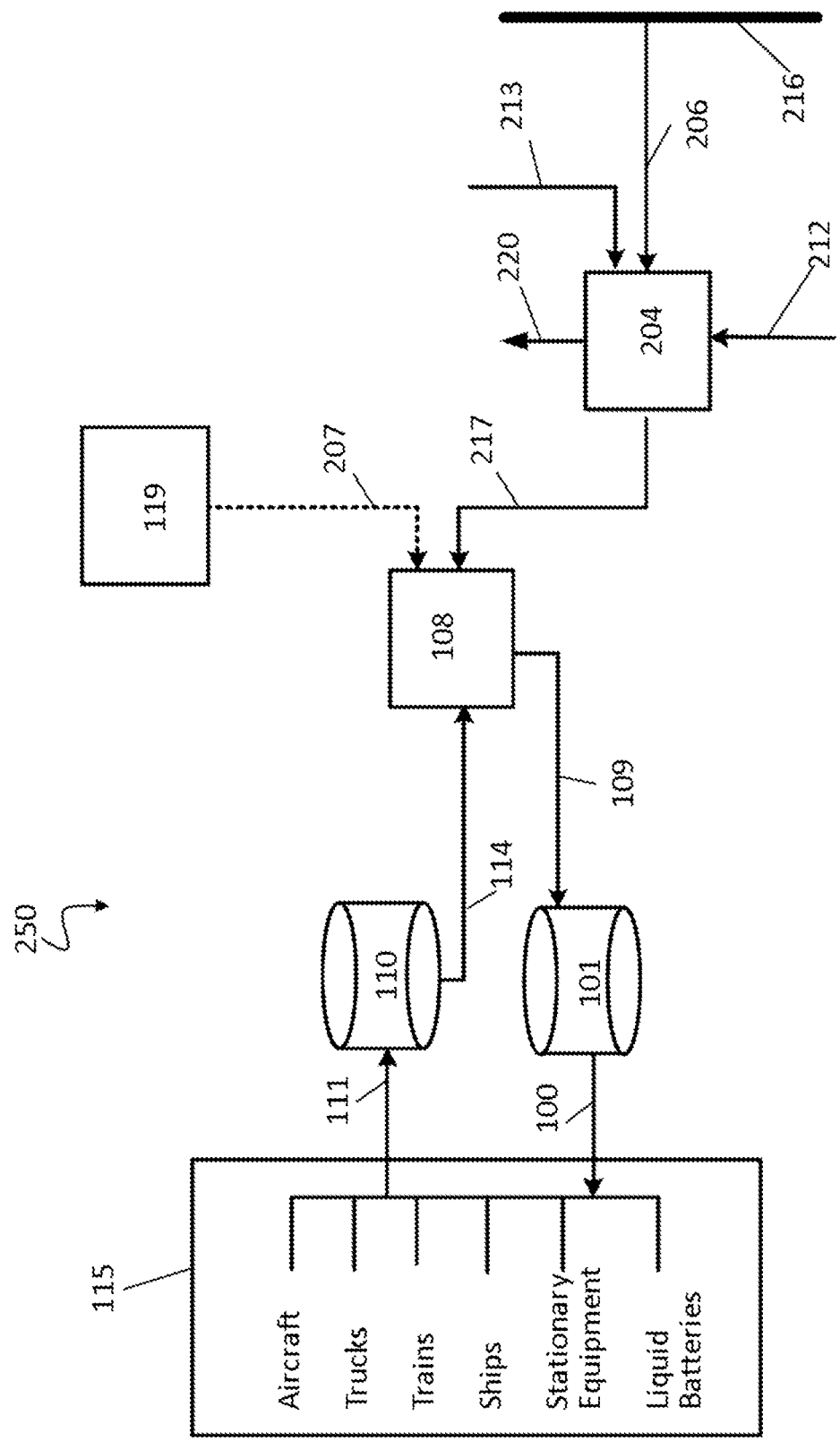
FIG. 2 illustrates a schematic of a carbon-neutral energy facility and processes to operate the system in hydrogen generation mode.

If available, green and/or blue hydrogen may be supplied for hydrogenation from external or internal sources of hydrogen source 119 via hydrogen stream 107 to maintain the hydrogenation of S-LOHC material into R-LOHC material when the CNEF system 150 is operated in a Power Export operating mode as further shown in the embodiments illustrated in FIG. 2.

In the embodiment illustrated in FIG. 1, a hydrogen source 119 is supplied from a renewable source (green hydrogen), or from a source in which any $CO_2$ generated during hydrogen production is captured using, for example, Carbon Capture Sequestration and Usage (CCSU) or hydrogen derived from electrolysis of water using nuclear energy, being carbon-neutral. Representative methods for making green hydrogen include photovoltaic mediated electrolysis, wind mediated electrolysis, and bio-gasification. Representative methods for making blue hydrogen include reforming with CCSU, pyrolysis with CCSU, and gasification with CCSU.

Spent external recycle S-LOHC 111 is transferred from any one or a plurality of external customer(s) 115 into S-LOHC storage tank 110, and then from 110 via supply stream 114 to hydrogenation unit 108. Hydrogenated R-LOHC 109 then passes to the R-LOHC storage tank 101.

Regenerated LOHC (R-LOHC) in storage tank 101 is delivered via an R-LOHC supply stream 100 to selected external customers 115 for use in powering aircraft, trucks, trains, ships, stationary equipment and/or liquid batteries, or used to provide power to the utility grid 116 in further alternative embodiments.

In embodiments in which the CNEF system 150 is functioning as a liquid battery, storage capacity is limited only by tankage volume and accordingly can be quantified or measured in energy terms equivalent to gigawatt-days (GW-days) or gigawatt-weeks (GW-weeks).

In related embodiments of the present disclosure, the delivered power capacity is limited only by installed R-SOFC storage capacity and can be scaled to meet anticipated utility power needs and the needs of any one or more of the external customers.

CNEF System in Hydrogen Generation Mode

According to the embodiment illustrated in FIG. 2, the CNEF system 250 can be operated in hydrogen generation mode, the methodology converting excess electricity when available into enriched or regenerated R-LOHC, thus acting as a means of energy storage in the form of a liquid battery.

In one embodiment as shown in FIG. 2, excess electricity 206 is imported from the utility grid supply 216 and converted in the R-SOFC 204 fuel cell operating in an electrolyzer mode. Air 213 is supplied to the cathode side of the R-SOFC 204. Injected water/steam 212, which may come from recycled sources, is split via electrolysis within 204 into hydrogen gas 217. Gas 217 then flows to the hydrogenation unit 108 in one embodiment. In another embodiment in which green/blue hydrogen from other hydrogen sources 119 is available, additional hydrogen source 119 can simultaneously be introduced via hydrogen stream 207, so that unit 108 can hydrogenate sourced S-LOHC material via supply stream 114 from S-LOHC storage tank 110 into hydrogenated R-LOHC 109 which is then stored in R-LOHC storage tank 101.

In related embodiments, spent external recycle S-LOHC 111 may then be transferred from any one or more of external sources 115 into S-LOHC tank 110, and then from 110 via supply stream 114 to hydrogenation unit 108. Hydrogenated R-LOHC 109 then passes to R-LOHC storage tank 101.

In further embodiments, regenerated LOHC (R-LOHC) from 101 is delivered as shown via supply stream 100 to external customers 115 for use in powering aircraft, trucks, trains, ships, stationary equipment and/or liquid batteries, or used to provide power to the grid when excess capacity or storage limits have been reached.

CNEF System in Power Generation Mode Using SMR

Figure 3:
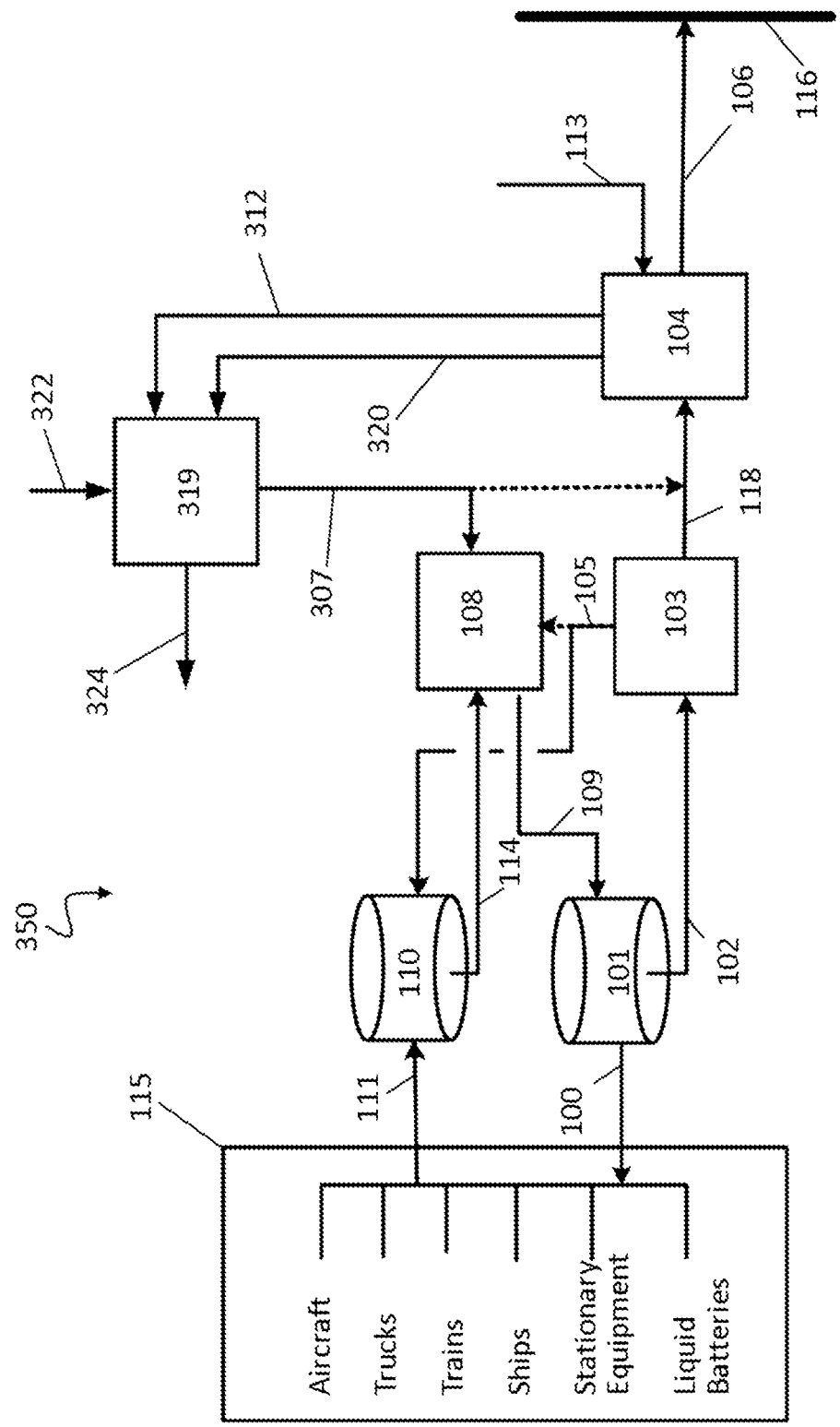
FIG. 3 illustrates a schematic of a carbon-neutral energy facility and processes to operate the system in power generation mode further employing a steam-methane reformer.

The embodiment illustrated in FIG. 3 demonstrates a method to supply hydrogen using an SMR (steam-methane reformer) unit integrated into a CNEF system 350, providing additional alternative embodiments in the operation and methodology of energy production.

In one embodiment shown in FIG. 3, R-LOHC 102 from storage tank 101 is dehydrogenated in hydrogen production unit 103 to release hydrogen gas 118 for use in R-SOFC 104 operating in Fuel Cell/Power Generation mode, thereby delivering electricity 106 to the utility grid 116.

In a further embodiment, air 113 is supplied to the cathode side of R-SOFC 104 and the unreacted oxygen or an oxygen containing gas 320 from R-SOFC 104 is supplied to the SMR unit 319. Hydrogen gas 307 is supplied to hydrogenation unit 108 from SMR unit 319, which then converts natural gas 322, in combination with water/steam 312 produced in the electrochemical conversion reaction within R-SOFC 104 and the oxygen or oxygen containing gas 320 to release hydrogen gas 307, which may then be used in further embodiments for the hydrogenation conversion of S-LOHC via supply stream 114 into hydrogenated R-LOHC 109. In a related embodiment, a portion of the hydrogen gas 307 may also be supplied to the fuel cell R-SOFC 104 as needed, as shown by the dotted line connecting 307 to the hydrogen gas 118 input to 104.

In another embodiment, the spent LOHC, or S-LOHC 105 obtainable from internal recycle material generated by the hydrogenation production unit 103 and available external recycle S-LOHC 111 may be transferred to S-LOHC tank 110 for later processing by hydrogenation via supply stream 114 into regenerated LOHC, R-LOHC 109. A portion of S-LOHC 105 from the dehydrogenation step conducted in 103 may also be supplied directly to unit 108 for hydrogenation.

In the embodiment illustrated in FIG. 3, any carbon dioxide ($CO_2$) 324 generated during hydrogen production may be captured using, for example, Carbon Capture Sequestration and Usage (CCSU). R-LOHC 102 supplied to hydrogen production unit 103 may also contain some amount of carbon-neutral R-LOHC to balance the carbon emitted from the CNEF system during operation as $CO_2$.

In a further embodiment, spent external recycle S-LOHC 111 is transferred from external sources 115 into S-LOHC tank 110, and from tank 110 via supply stream 114 to the hydrogenation unit 108. Hydrogenated R-LOHC 109 may then to transferred to R-LOHC storage tank 101.

Further, in related embodiments, regenerated LOHC (R-LOHC) from storage tank 101 is delivered as shown in supply stream 100 to external customers 115 for use in powering aircraft, trucks, trains, ships, stationary equipment and/or liquid batteries, or used to provide power to the grid.

CN Storage System in Liquid Battery Storage Mode

Figure 4:
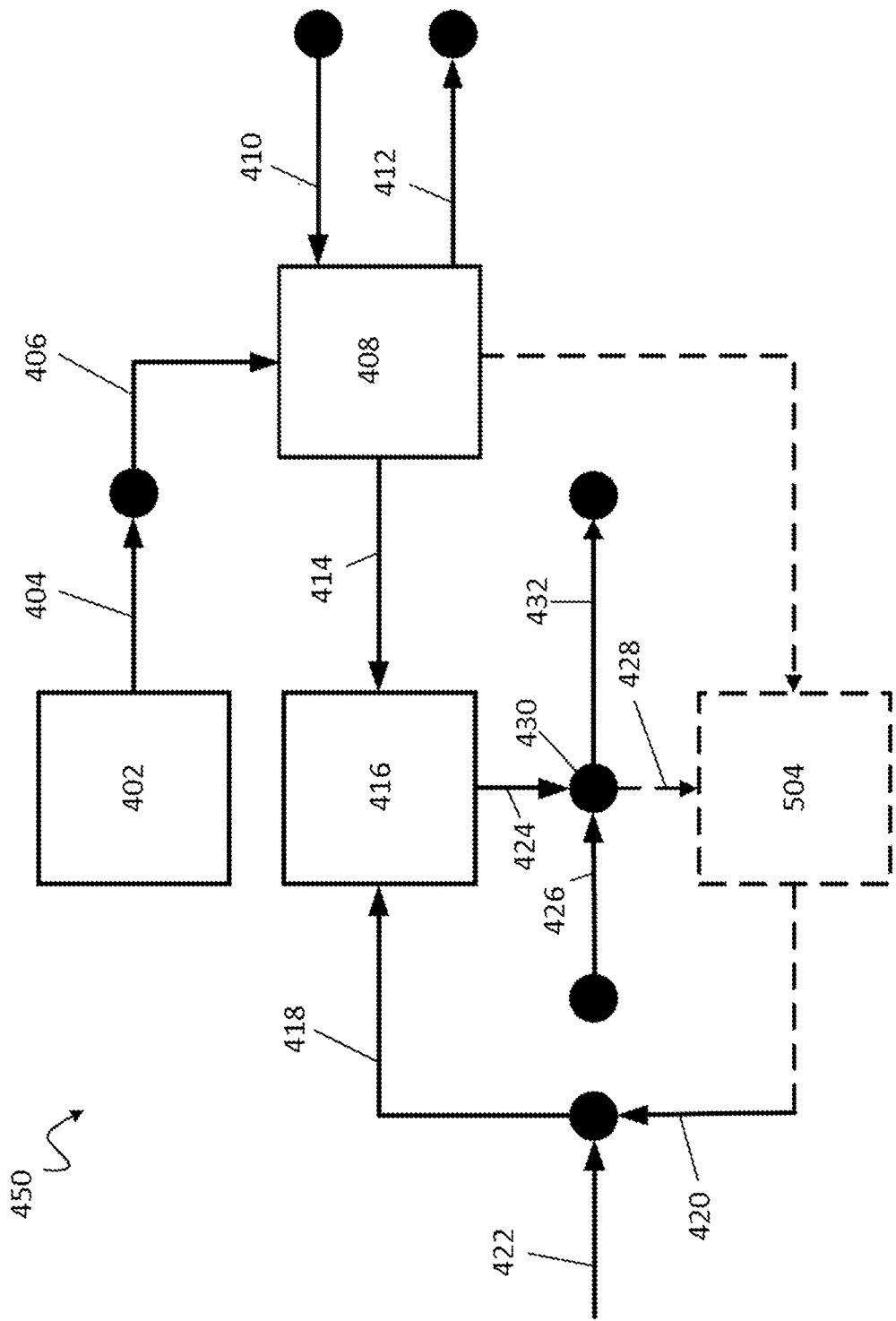
FIG. 4 illustrates an embodiment of a carbon-neutral storage system and processes for storing carbon-neutral (CN) electrical energy during periods when excess renewable electricity is available from the grid.

FIG. 4 illustrates a schematic representation of one embodiment of a CN (carbon neutral) storage system 450 according to the disclosed methods and processes wherein the various apparatus and physical units of the CNEF system may be employed for operation during periods of relatively reduced electricity demand and/or during periods of relatively higher electrical output from the grid, giving rise to excess electricity availability, providing an opportunity to convert the excess electricity to its equivalent chemical potential in the form of an enriched or regenerated R-LOHC product.

Process units, process steps and process streams shown in FIG. 4 that are active under these operating conditions are designated by solid lines while those steps, units and associated process elements that are on standby are designated by dashed lines. As shown in FIG. 4, one embodiment of the disclosed process includes the first step of conveying some metered electricity portion 406 of the electricity output 404 originating from an electricity generating utility grid 402 to an electrolysis unit 408 for the electrochemical conversion of incoming water feed 410 to produce generated hydrogen gas 414. In other embodiments in which the electricity from the utility grid is solely sourced from one or more renewable energy sources ("renewable electricity"), the hydrogen gas generated using the electrolysis unit 408 may be termed "green hydrogen" to identify it as having been generated with zero or negligible GHG emissions to the atmosphere. In related embodiments, this generated hydrogen gas 414 may be captured and stored directly to serve as a supply of hydrogen gas as fuel for customers employing hydrogen burning equipment and vehicles, and other uses.

In one embodiment, the electrolysis unit 408 is configured and controlled to reversibly operate as an electrolytic cell when electricity from the utility grid 402 is available for electrochemical conversion of water to hydrogen and oxygen, and in an alternate embodiment to operate as a fuel cell for generating electricity by the electrochemical conversion of hydrogen to water when electricity from the utility grid 402 is not available or used.

One non-limiting exemplary reversible electrochemical cell suitable for use herein is a solid oxide cell that operates as a solid oxide electrolyzer cell (SOEC) when supplied with water and an electric current, and which alternatively operates as a solid oxide fuel cell (SOFC) to generate an electric current by the electrochemical conversion when provided with an input of hydrogen gas and air. Another non-limiting exemplary cell is a proton exchange membrane electrochemical cell (PEMEC) configured and operated in a similar manner as a reversible cell, using input electric current to generate hydrogen and oxygen when supplied with water and operating as a proton exchange membrane fuel cell to generate an electric current by the electrochemical conversion of input hydrogen gas and air when operated in a reverse manner. In other embodiments, other reversible fuel cell/electrolyzer devices may be suitable used in place of an electrolysis unit 408.

In a further embodiment as shown in FIG. 4, generated hydrogen gas 414 produced by the electrolysis unit 408 may be compressed to approximately 10 Barg (gauge pressure in bars) and used to hydrogenate an S-LOHC feed 418 in a hydrogenation unit 416 operating at approximately 220° C., while export oxygen gas 412 produced in 408 may be used to reduce emissions in furnaces or refinery processes such as Fluid Cat Crackers (FCCs) when co-located with oil refineries or other industrial locations, or alternatively in other embodiments, when collected and stored for other uses.

In another embodiment, catalytic hydrogenation in hydrogenation unit 416 may be preceded by one or more conditioning steps (not shown), wherein suitable conditioning steps include processing the generated hydrogen gas 414 and/or the S-LOHC feed 418 to achieve the desired temperature, pressure and purity required for an efficient process. In a further related embodiment, a carbon-neutral (CN) component (not shown) may also be blended in a first step with the S-LOHC feed 418 to the hydrogenation unit 416 prior to the subsequent step of hydrogenation of the resulting blend.

In a further embodiment, the S-LOHC feed 418 is available for catalytic hydrogenation from one or more sources, including recycle S-LOHC 420 from a dehydrogenation reaction zone and/or an import S-LOHC 422 that may be sourced from petroleum or other sources, wherein any portion of the import or recycle S-LOHC that is derived from biological or renewable sources is not counted toward the CN content of the R-LOHC feed blend.

In yet further related embodiments, the hydrogenated R-LOHC 424 may be mixed with CN component 426, and the resulting R-LOHC feed blend may be stored in an R-LOHC feed blend storage vessel 430, to either supply dehydrogenation unit 504, and/or to supply export R-LOHC 432 to a storage tank for eventual delivery to an external customer, and/or to supply fuel cells during times of electrical deficit on the utility grid. In another alternative embodiment, R-LOHC feed blend 428 from the feed blend storage vessel 430 can be further processed by a dehydrogenation unit, such as dehydrogenation unit 504.

CN Storage System Under Conditions of High Electricity Demand

Figure 5:
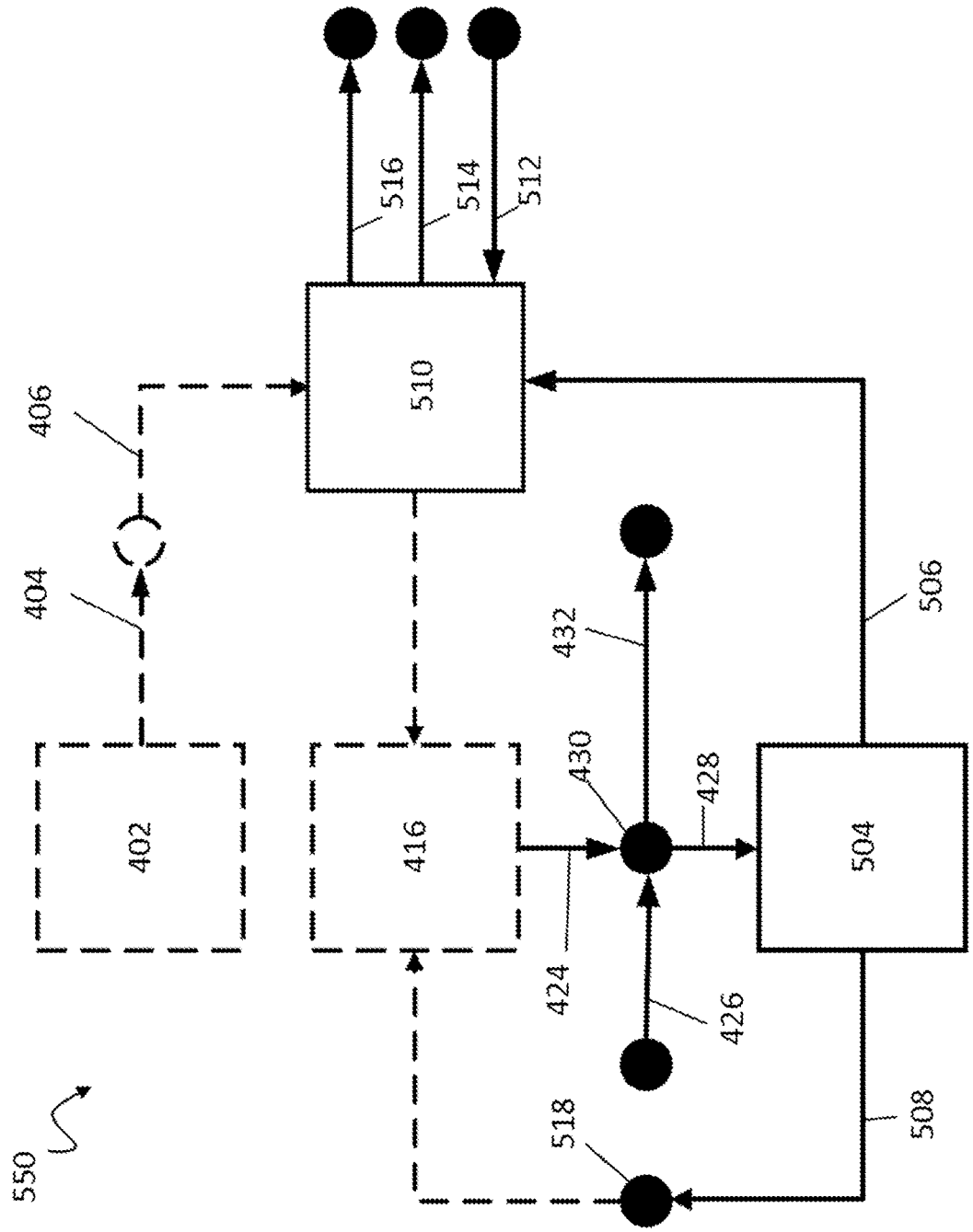
FIG. 5 illustrates an embodiment of a carbon-neutral storage system and processes for generating CN electrical energy during periods when a reduced amount of electricity is available from the grid.

FIG. 5 illustrates one embodiment of a CN storage system 550 according to the disclosed methods and processes herein wherein component units of the CNEF system may be used for operation during periods of high electricity demand that may exceed the normal output of the electricity generating utility grid 402, or alternatively during periods of low electrical output from 402, wherein methods of the present disclosure provide for utilizing the process and apparatus to generate electricity under external deficit electrical conditions.

Process units, process steps and process streams shown in FIG. 5 that are active under these operating conditions are designated by solid lines while those elements that are on standby are designated by dashed lines. Under the operating condition of high electricity demand, the utility grid 402 plays a reduced role in the process, as the disclosed processes are now operated and controlled to supply export electricity 514 by processing an R-LOHC feed blend 428 in dehydrogenation unit 504. Reaction products from dehydrogenation unit 504 include hydrogen gas to be used as hydrogen fuel cell feed 506 and S-LOHC 508 which may be reprocessed. In one embodiment, the generated hydrogen gas and hydrogen fuel cell feed 506 qualifies as a source or feed of "blue", or alternately "green" or, yet alternately "blue/green" hydrogen, depending on the precise nature of the source of an input feed and/or R-LOHC feed blend 428 used to produce the generated hydrogen gas.

In a further embodiment as illustrated in FIG. 5, the hydrogen fuel cell feed 506 is conditioned as described herein in related embodiments, and in an additional process step 506 may be supplied to fuel cell 510 for electrochemical conversion with oxygen gas supplied by means of an oxygen gas fuel cell feed 512. Export electricity 514 generated in fuel cell 510 may be exported to the utility grid or used internally to one or more related embodiments of the disclosed processes herein. Fuel cell aqueous products 516 are produced during electricity generation by 510, water being the primary ingredient of 516, which may be further used in one or more embodiments of the disclosed processes herein, or extracted for other uses, such as to produce potable water. The resulting hydrogen depleted or "spent" S-LOHC 508 may be returned to an S-LOHC storage vessel, such as a spent S-LOHC storage tank 518 for subsequent reprocessing and hydrogenation to produce additional regenerated R-LOHC material.

In a related embodiment, a CN component may be blended into a R-LOHC product, either using one or more of the processes disclosed herein at a process location or at a third party customer's location. In one embodiment as shown in FIG. 5, hydrogenated R-LOHC 424 is processed and stored in an R-LOHC feed blend storage vessel 430 after blending with a predetermined amount of the CN component 426 to produce an export R-LOHC 432 containing the requisite amount of CN component based on the intended use. In further related embodiments, the resulting 432 material may be retained in a storage tank or exported from the CNEF system via transport by pipeline, truck, railway or other means to another location for use.

CNEF System Operating in Grid Decoupled Mode

Figure 6:
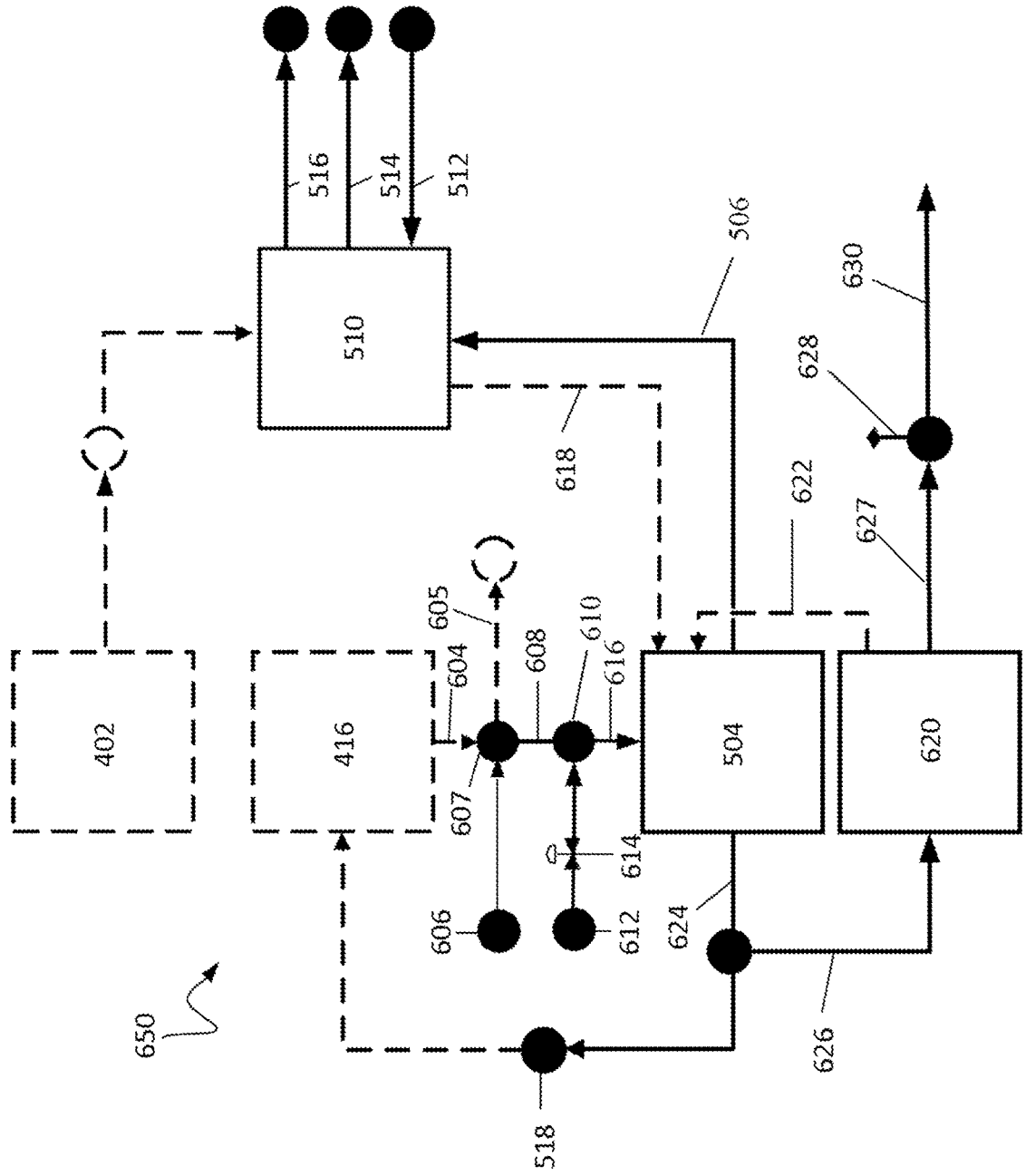
FIG. 6 illustrates an embodiment of a carbon-neutral storage system and processes, including combustion means to supply heat for operating a dehydrogenation reactor.

FIG. 6 illustrates additional embodiments of a CN storage system 650 according to the disclosed methods and processes wherein component units of the CNEF system may be used for operation when the CNEF system is decoupled from the electrical grid and operating independently of externally supplied electricity.

FIG. 6 illustrates one embodiments for carrying out the processes disclosed and described herein during periods of high electricity demand and/or low electrical output from the electricity generating utility grid 402, when decoupled from the grid. Process units, process steps and process streams illustrated in FIG. 6 that are active under these operating conditions are designated by solid lines while those elements that are on standby are designated by dashed lines, with the exception of 618 and 622, as described hereinbelow.

In one embodiment as illustrated in FIG. 6, a supply of R-LOHC 604 may be blended with a selected amount of a first CN component 606 to make a first LOHC feed blend 608 containing approximately between 0.1 to 10 wt % of the first CN component, or alternatively between 0.1 to 5 wt %, or yet alternatively between 0.1 to 1 wt % thereof. A portion of the first LOHC feed blend 608 may be extracted from the process as a first LOHC feed blend 605 export stored for use in other local or remote process operations, suitably equipped vehicles or stationary devices.

In another embodiment, the first LOHC feed blend 608, optionally stored and retrievable from a first LOHC feed blend storage vessel 610 may be further blended using mixing valve 614 with a second CN component 612 to increase overall carbon-neutral content in a resulting second LOHC feed blend 616 when desired. The addition of the second CN component 612 may be controlled by mixing valve 614 whose operation is to supply a requisite amount of carbon-neutral carbon that is at least equal to or greater than the amount of carbon emitted to the atmosphere by the embodied process. In one embodiment, the resulting second LOHC feed blend 616 that is produced may be used as a supply feed for a further dehydrogenation step containing approximately between 1 to 10 wt % of overall carbon-neutral carbon (CNC) content resulting from the addition of the first and second CN components 606 and 612, respectively.

FIG. 6 also illustrates components and process steps in further embodiments in which thermal energy in the form of heat produced by the disclosed process is used to supply the requisite amount of heat required for efficient dehydrogenation, including, but not limited to heat supplied to preheat the dehydrogenation feed, heat to overcome the endothermic threshold of a dehydrogenation reaction and heat to maintain the dehydrogenation reactor at suitable reaction conditions. In one embodiment, at least a portion of the thermal energy needed for dehydrogenation is supplied by fuel cell heat 618 generated in the fuel cell 510, wherein fuel cell 510 may be an SOFC type fuel cell that is configured and operated to supply all of the heat required for dehydrogenation. Alternatively, in closely related embodiments to that immediately hereinabove, the fuel cell 510 may be of an SOFC type fuel cell or yet alternatively a PEMFC type fuel cell that is configured to supply some portion of the heat required for a dehydrogenation operation. Under these embodied processes, a combustor 620 may be provided to supply at least a portion of the generated thermal energy in the form of heat of combustion 622 needed for a dehydrogenation process. In a further embodiment as schematically illustrated in FIG. 6, an LOHC feed portion 626 of the S-LOHC product 624 stored in the spent S-LOHC storage tank 518 and derived from a dehydrogenation process is then supplied to combustor 620, and at least a portion of the subsequent heat of combustion 622 generated by the combustion is supplied to the dehydrogenation unit 504.

A carbon detector 628 may be provided to monitor the carbon emissions released from combustor 620 during the combustion process, including carbon oxides present in the combustor exhaust 627, which contains carbon dioxide, and is then released as a gaseous exhaust to atmosphere 630. Many suitable carbon detectors are well known in the art, including detectors based on infrared detector technology. The carbon detector 628 may be configured to be in electrical communication with mixing valve 614 for controlling the supply of one or more of the disclosed CN components (606, 612 or a combination thereof) to be blended into the R-LOHC 604 product, the detected level of emitted carbon oxides being used to control the amount of either a first or second CN component containing a LOHC feed blend added for maintaining a net overall carbon-neutral operation of the embodied processes as described herein. The blended R-LOHC 604 may be temporarily stored in transient storage tank 607 for later transfer as a first LOHC feed blend 608 to a first LOHC feed blend storage vessel 610, or alternatively in another embodiment 604 may be transferred via export feed 605 for alternative analysis, storage or transfer for other purposes than on-site regeneration.

In the embodiments disclosed above, the various processes and steps may be combined and performed in any suitable combination to provide for the storage of electrical energy from the grid as stored chemical energy in the form of labile hydrogen contained within an LOHC product, and subsequent harvesting of that labile hydrogen and electrical energy released by its conversion by dehydrogenation and subsequent conversion to electricity using combinations of hydrogenation and dehydrogenation reactions, electrolysis and recombination reactions, and combustion processes performed with the various LOHC products, blends and compositions as described. Further embodiments of the present disclosure include performance of the methods and process steps in various orders, including processes performed in repeated or cyclic orders to achieve an overall CN operation.

Materials

In the various embodiments described hereinabove, the LOHC is a hydrogen rich carbonaceous material that is chemically stable and normally liquid at ambient conditions, having a large hydrogen capacity, but without the associated risks that are inherent with high pressure hydrogen gas storage. The labile hydrogen may be reversibly removed from the recyclable LOHC during dehydrogenation without decomposing the underlying aromatic substrate structure of the carrier. Furthermore, the recyclable LOHC provides a reliable and stable source of hydrogen without the net positive $CO_2$ emissions that are generally associated with hydrocarbon combustion to provide the thermal energy for dehydrogenation.

The LOHC may be a cycloparaffin with a hydrogen storage capacity of at least about 5 wt % labile hydrogen, and in some cases at least about 6 wt % labile hydrogen. The LOHC may comprise a cyclic saturated hydrocarbon such as cyclohexane, methylcyclohexane and/or decalin; reversible dehydrogenation conversion of the spent (hydrogenated) or partially dehydrogenated LOHC produces the corresponding aromatic substrate: benzene, toluene, or naphthalene. The recyclable LOHC may comprise at least about 80 wt % methylcyclohexane (MCH), or at least about 90 wt % MCH, or in a range from 95 to 99.9 wt % MCH. The recyclable LOHC may comprise a blend of a hydrogenated carrier component, such as a hydrogenated recycle component recovered from a hydrogen-to-electricity generation process, from 0.1-25 wt % of a hydrogenated carbon-neutral component that is prepared from carbon-neutral precursors, and at least about 5 wt % added carbon-neutral hydrogen that is available for removal in a reversible dehydrogenation reaction.

The LOHC materials suitable for use herein are characterized also as an LOHC pair, with an at least partially hydrogenated form of the LOHC (i.e., R-LOHC product) being predominately one member of the pair, while an at least partially dehydrogenated form of the LOHC (i.e., S-LOHC product) as the other member of the LOHC pair. LOHC pairs suitable for the present invention include monocyclic pairs such as benzene/cyclohexane and toluene/methylcyclohexane. Exemplary homopolycyclic LOHC pairs include the decalin/naphthalene and perhydro-benzyl toluene/benzyl toluene pairs. Exemplary heteropolycyclic LOHC pairs include the 1-methyl perhydro indole/1-methyl indole, 1,2-perhydrodimethyl indole/1,2-dimethyl indole, and perhydro dibenzyl toluene (18H-DBT)/dibenzyl toluene (OH-DBT) systems. (See Rao, et al., *Energies* 2020, 13(22), 6040, and Wunsch, et al., *Materials* 2020, 13(2), 277).

The LOHC pair designation is thus fully represented by two interconvertible chemical structures, one being fully dehydrogenated and one being fully hydrogenated. By "fully dehydrogenated" is meant to indicate that all of the labile hydrogen atoms have been removed, leaving the resulting molecule in its aromatic substrate form. In the case of the toluene/MCH pair, the toluene molecule is the fully dehydrogenated species, having the aromatic substrate form. By "fully hydrogenated" is meant to indicate that all of the sites on the molecule available for labile hydrogen attachment are occupied, being the most fully hydrogen saturated form. In the case of the toluene/MCH pair, the MCH molecule is the fully hydrogenated species.

The recyclable LOHC may be produced for use in the process by blending a recycle component and a predetermined target blend fraction, based on the weight of the blend, of a carbon-neutral component; and adding at least about 5 wt % carbon-neutral hydrogen to the unloaded hydrogen carrier by catalytic hydrogenation to form the recyclable LOHC.

Alternatively, the recyclable LOHC may be produced by combining a hydrogenated recycle component and a predetermined target blend fraction, based on the weight of the recyclable LOHC, of a hydrogenated carbon-neutral component, the recyclable LOHC also containing at least about 5 wt % carbon-neutral hydrogen.

The recycle component may be an aromatic substrate material comprising one or a combination of aromatic substrates, such as benzene, toluene, and/or naphthalene, which may be combined with the carbon-neutral component and the combination catalytically hydrogenated to form the recyclable LOHC. Alternatively, the recycle component may be hydrogenated prior to blending with a hydrogenated carbon-neutral component to form the recyclable LOHC.

At least a portion of the recycle component may be recovered from a hydrogen to electricity generation process, in which hydrogen is delivered as chemically bound hydrogen, liberated by dehydrogenation, and an unloaded aromatic substrate byproduct from dehydrogenation recovered as at least a portion of the recycle component. The recycle component may also contain relatively minor amounts of dehydrogenation reaction byproducts, including incompletely dehydrogenated hydrogen carrier and single and multi-ring aromatics. The recycle component may include toluene as the unloaded aromatic substrate, and non-toluene dehydrogenation byproducts, such as MCH, partially dehydrogenated MCH, xylene, and multi-ring aromatics. The recycle component may contain at least 50 wt % toluene; in some instances, at least 75 wt % toluene; in some instances, at least 93 wt % toluene. At least 10 wt % of the recycle component may be recovered from a hydrogen-to electricity generation process.

As the recycle component is included in the recyclable LOHC as a source of hydrogen only, a "make-up" component may be included in the recycle component to make up for shortfall in available supply. In one embodiment, the make-up component comprises up to 100 wt % carbon-neutral material, such that all carbon losses in the CNEF are matched by an equivalent amount of carbon-neutral material in the R-LOHC. The recycle component may comprise up to 100 wt % make-up component, though as use of the present process progresses, progressively more of the recycle component will be recovered from a hydrogen-to-electricity process, such that at least 20 wt %, or at least 50 wt %, or at least 70 wt %, or at least 90 wt % of the recycle component will be recovered from a hydrogen-to-electricity process. The make-up component may comprise at least 50 wt % toluene, or alternatively at least 70 wt %, or alternatively at least 90 wt % toluene, or yet alternatively at least 95 wt % toluene, up to and including 100 wt % toluene.

A carbon neutral component is included as an additive in the unloaded hydrogen carrier for maintaining carbon neutral operation of the process. The carbon-neutral component is produced from molecular precursors either that are produced with no $CO_2$ generation, which are produced with recycled atmospheric $CO_2$, or that are produced with $CO_2$ capture and ultimate storage generated during their production, any of which do not result in a net increase in atmospheric $CO_2$.

In one embodiment, the carbon-neutral component contained in the recyclable LOHC is produced from biomass. Biomass from plant or animal sources can be purposely grown energy crops, wood or forest residues, waste from food crops, horticultural waste, or food processing residues. Production of carbon-neutral component from biomass generally involves one or more biomass conversion steps, such as pyrolysis, gasification, anaerobic digestion, or fermentation. Typical reaction products from these processing methods include one or more of methanol, ethanol, methane, acetic acid, lactic acid, and syngas. One or more of these biomass conversion products may be used to generate an aromatic precursor of the carbon neutral component.

As carbon contained in the carbon-neutral component is itself carbon neutral, it is classified as a renewable energy source, and therefore available as a combustion source for the process. Therefore, for purposes of this disclosure, $CO_2$ generated from combustion of the carbon-neutral component or its hydrogenated carbon-neutral component analog is termed "green $CO_2$" to indicate that the generated $CO_2$ has been recycled from the atmosphere, and does not contribute to a net increase in atmospheric $CO_2$. Likewise, the process of using the recyclable LOHC for generating electricity is carbon neutral.

The unloaded hydrogen component may comprise the recycle component, the predetermined target blend fraction, based on the weight of the unloaded hydrogen component, of the carbon-neutral component, and at least about 5 wt % chemically bound carbon-neutral hydrogen as labile hydrogen.

The unloaded hydrogen component may comprise at least 20 wt % of the recycle component.

Generally, the unloaded hydrogen component comprises at least 0.1 wt % carbon neutral component; in some instances, in a range from 0.1-25 wt % carbon-neutral component; in some instances, in a range from 0.5-15 wt % carbon-neutral component; in some instances, in a range from 0.5-6 wt % carbon-neutral component. As used herein, the proportion of the carbon-neutral component in the unloaded hydrogen carrier, based on the total unloaded hydrogen carrier, is termed the "target blend fraction."

The recycle component of the unloaded hydrogen carrier may include contaminants, such as byproducts from the dehydrogenation reaction, which are usefully reduced in concentration or removed from the unloaded hydrogen carrier prior to or during hydrogenation. Purification of the unloaded hydrogen carrier by removal or conversion of the contaminants, may include process steps such as hydrogenation, distillation, liquid-liquid separation, crystallization, absorption onto a solid absorbent, and the like.

The recyclable LOHC that is to be delivered for generating electricity may be prepared by catalytic hydrogenation of one or more toluene-based precursors. A carbon-neutral toluene prepared from carbon-neutral precursors may be included. A recycle liquid from a hydrogen-to-electricity process, comprising toluene, may be included. One or more of the toluene-based precursors may be catalytically hydrogenated individually to contain at least about 5 wt % labile hydrogen, and the hydrogenated MCH products blended to form the recyclable LOHC. One or more of the toluene-based precursors may be blended to form an unloaded hydrogen carrier, that then may be catalytically hydrogenated to form the recyclable LOHC. In effect, the recyclable LOHC may be prepared by any combination of blending steps and catalytic hydrogenation steps to prepare the recyclable LOHC.

LOHC

The liquid organic hydrogen carrier LOHC consists of at least one partially hydrogenated liquid organic compound having a cyclic chemical structure; wherein the LOHC is a compound that is interconvertible between a fully hydrogenated form and at least one of a partially or fully dehydrogenated form without significant chemical decomposition. Further, the LOHC is selected from a monocyclic molecule, a homocyclic molecule, polycyclic molecule and a heterocyclic molecule, and combinations thereof. Further, the LOHC is selected from benzene, toluene, xylene, xylol, dimethylbenzene, trimethylbenzene, naphthalene, benzyltoluene, 1-methyl perhydro indole, 1,2-perhydrodimethyl indole, perhydro dibenzyl toluene, and all fully hydrogenated isomers thereof, and combinations thereof. Further, the LOHC consists of at least one partially or fully hydrogenated compound selected from cyclohexane, methyl cyclohexane, dimethyl cyclohexane, trimethyl cyclohexane, benzyl methyl cyclohexane, decalin, 1-methyl indole, 1,2-dimethyl indole, dibenzyl toluene, and all partially dehydrogenated isomers thereof, and combinations thereof. The methods and processes disclosed herein involve the interconversion between a partially or fully hydrogenated LOHC (R-LOHC) and it's correspondingly partially dehydrogenated or fully dehydrogenated LOHC form (S-LOHC).

In further embodiments, the R-LOHC is substantially hydrogenated to contain at least 5 wt % labile hydrogen.

Hydrogenation

Suitable hydrogenation/dehydrogenation reactors and hydrogen production units suitable for use herein are well known in the art. The catalytic hydrogenation steps disclosed herein include passing the hydrogenation zone feedstocks in liquid or vapor phase over a suitable hydrogenation catalyst that is maintained at a temperature in a range of 200 to 300° C. and at a positive pressure of up to 20 bar. The hydrogenation catalyst may be powdered or in extrudate form. In one aspect, the catalyst may comprise a metal, such as platinum, palladium, nickel, cobalt, or a mixture thereof. The metal mixture may further be compounded with molybdenum. In related embodiments, the hydrogenation catalyst may comprise palladium, platinum, or a mixture thereof. The metal composition may be supported on an oxide material comprising, for example, alumina, silica, titania, or a mixture thereof in any ratio, or silica-alumina support having a surface area of greater than 150 m2/g. An additional component or alternative support may include an acidic zeolite with 10 or 12 Angstrom ring openings such as faujasite, Beta zeolite or ZSM-5. The hydrogenation catalyst composition may be sulfided prior to use. The hydrogenation reaction may be conducted in an existing refinery having suitable catalyst reaction and support facilities to produce the recyclable LOHC with a purity suitable for use in the present process.

In one embodiment, the catalyst is a particulate solid, comprising particulates in the form of irregular shaped particulates, powder particulates, cylindrical particulates, or spherical particulates, and having a diameter ranging from 0.1 mm to 5 mm. In one embodiment, reactor tubes through which the reacting fluid flows are coated on the inside surface of the tubes with a coating of a catalytic material.

Fuel Cells

Embodiments of the disclosed CNEF system may employ a fuel cell electrochemical device for converting generated hydrogen gas to electrical power. The fuel cell device generates electricity by conversion of chemical energy of the hydrogen fuel and air into electricity through a pair of redox reactions. Suitable fuel cells for use in may be selected from an alkaline fuel cell (AFC), a proton-exchange membrane fuel cell (PEMFC), a phosphoric acid fuel cell (PAFC), a molten carbonate fuel cell (MCFC), an oxide ceramic or solid oxide fuel cell (SOFC), or the like. All may be operated according to one or more of the embodied process steps using atmospheric oxygen obtained from the environment as an oxidizer gas, with the result that no storage of oxygen gas is required. In further embodiments, the fuel cell device may comprise one or more individual fuel cell units, operated either in serial or parallel mode as needed. The electrochemical conversion devices suitable for use herein for converting carbon-neutral hydrogen to electrical power may include a solid oxide fuel cell (SOFC) device operating in a temperature range 400-650° C. Approximately 30-35% of the energy generated in the SOFC is thermal energy that is suitable for at least partially maintaining the dehydrogenation reaction zone temperature. Gases exhausted from the anode side of the SOFC system include unreacted hydrogen and a small amount of S-LOHC that was carried along with hydrogen feed to the SOFC from a dehydrogenation zone. In another embodiment, gases exhausted from the cathode side of the SOFC system, including oxygen depleted air and water vapor, may be combined with the anode exhaust stream in a catalytic conversion unit, which produces water, oxygen depleted air and $CO_2$ from aromatic liquid oxidation.

An R-LOHC feed blend for use with the SOFC device may be contain in a range of 0.1-10 wt % of a secondary R-LOHC component in order to maintain the overall carbon-neutral process.

Additional suitable electrochemical conversion devices for converting carbon-neutral hydrogen to electrical power may include a proton-exchange membrane fuel cell (PEMFC) operating in a temperature range 50-100° C. Only a small portion, if any, of the heat generated by a PEMFC may be available for use with the dehydrogenation reaction zone. The remaining heat for dehydrogenation when employing a PEMFC fuel cell device may in one embodiment be provided by combustion of a portion of the combustion liquid. In this case, an R-LOHC feed blend for use with the PEMFC unit may contain in a range of 0.1-25 wt %, or, alternatively 0.5-15 wt %, or alternatively 1-10 wt % of a secondary R-LOHC feed component in order to maintain the overall carbon-neutral process.

The electricity generated in the fuel cell electrochemical device may be used internally for heat or propulsion, or exported to the electrical grid. Export electricity is important for compensating for reduced generation rates from renewable energy that supplies the electrical grid.

In one embodiment, the electrochemical cell may serve a dual purpose as an electrolyzer under electrolysis conditions and as a fuel cell under fuel cell conditions. Under electrolysis conditions, an electric current is passed to the cell that is in contact with water or an aqueous solution to generate hydrogen. Under fuel cell conditions, purified hydrogen is supplied to the anode of the fuel cell and oxygen, generally as air or an oxygen-enriched air stream, is supplied to the cathode. In embodiments employing dual purpose cells, electricity generated in the electrochemical conversion reaction may be passed from the fuel cell to an external circuit. Dual purpose proton exchange membrane cells operate as an electrolysis cell (PEMEC) and as a fuel cell (PEMFC) at temperatures of generally less than 100° C. and often in a range of 50-80° C., though experimental versions that operate at higher temperatures are known in the art. Dual purpose solid oxide cells operate as an electrolysis cell (SOEC) and as a fuel cell (SOFC) at temperatures of generally 500-850° C., though experimental versions that operate at lower temperatures are known.

A solid oxide electrolyzer cell (SOEC) is a solid oxide fuel cell that runs in regenerative mode to achieve the electrolysis of water by using for example, but not limited to a solid oxide, or ceramic electrolyte. The electrolysis reaction proceeds with the oxidation of water occurring at the anode and reduction of water occurring at the cathode to produce hydrogen gas and oxygen. Solid oxide electrolyzer cells typically operate at temperatures between 400 and 850° C. Suitable SOEC electrolysis systems are well known in the art.

SMR Units

SMR (steam-methane reformer) units suitable for use herein are well known in the art, and may be employed in the disclosed embodiments of the disclosure with little or no modification necessary. SMR is a cost-effective and energy efficient way of producing hydrogen. In one embodiment employing the steam reforming process, the hydrocarbon feedstock is pre-heated, mixed with steam and optionally pre-reformed before passing a catalyst in a top-fired steam reformer to produce hydrogen, carbon monoxide (CO) and carbon dioxide ($CO_2$). The CO is shifted with steam to additional hydrogen and $CO_2$, and the hydrogen may then optionally be separated using for example, but not limited to, a pressure swing adsorption. Hydrogen produced by steam reforming is termed 'grey hydrogen' when the waste carbon dioxide is released to the atmosphere and 'blue hydrogen' when the carbon dioxide is (mostly) captured and stored. In related embodiments, a pre-reforming step is needed to break down higher into methane ($CH_4$), which allows for more efficient reforming in a SMR unit.

The above illustrations provide many different embodiments or embodiments for implementing different features of the invention as disclosed herein. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims.

Accordingly, it is appropriate that the appended claims be construed broadly and in a manner consistent with the scope of the invention as disclosed by the various embodiments as disclosed herein, as set forth in the following claims.

The invention claimed is:

1. A method of operating a Carbon Neutral Energy Facility (CNEF) system to provide a carbon captured fossil fuel or renewable energy source in the form of a carbon neutral (CN) Liquid Organic Hydrocarbon composition (LOHC) comprising:
   a) generating a hydrogenated LOHC composition (R-LOHC) using a source of carbon neutral (CN) hydrogen from a fossil fuel source or carbon neutral (CN) hydrogen gas derived from carbon neutral (CN) electrical energy obtained from a renewable resource, and using a source of electricity obtained from an electrical utility grid;
      wherein the source of said LOHC is a partially or fully dehydrogenated LOHC (S-LOHC);
   b) providing said R-LOHC to at least one customer;
   c) receiving said S-LOHC from said customer;
   d) regenerating said S-LOHC received from said customer by further hydrogenation of said S-LOHC into said R-LOHC by using a hydrogenation unit powered by said CN electrical energy or by means of said CN hydrogen;
      wherein said source of hydrogen gas is either generated internally to said CNEF system or obtained from said renewable resource; and
   e) storing said R-LOHC for either internal use within said CNEF system or for redistribution to a customer,
   wherein said R-LOHC contains an added secondary carbon-neutral (CN) component; and
   wherein said secondary CN component is derived from a carbon-neutral carbon (CNC) sourced material wherein any loss of carbon dioxide to the environment is offset by the addition of said secondary CN component in an amount sufficient to equal the said carbon content loss to the environment;
   wherein said LOHC is a compound that is interconvertible between a fully hydrogenated form and at least one of a partially or fully dehydrogenated form without significant chemical decomposition;
   wherein said LOHC is selected from a monocyclic molecule, a homocyclic molecule, polycyclic molecule and a heterocyclic molecule, and combinations thereof;
   wherein said S-LOHC consists of at least one of benzene, toluene, xylene, xylol, dimethylbenzene, trimethylbenzene, naphthalene, benzyl-toluene, 1-methyl perhydro indole, 1,2-perhydrodimethyl indole, perhydro dibenzyl toluene, and all fully hydrogenated isomers thereof, and combinations thereof; and wherein said R-LOHC consists of at least one partially or fully hydrogenated compound selected from cyclohexane, methyl cyclohexane, dimethyl cyclohexane, trimethyl cyclohexane, benzyl methyl cyclohexane, decalin, 1-methyl indole, 1,2-dimethyl indole, dibenzyl toluene, and all partially dehydrogenated isomers thereof, and combinations thereof.

2. The method according to claim 1, wherein said fossil fuel source includes natural gas obtained by means of a Carbon Capture Sequestration and Usage (CCSU) process.

3. The method according to claim 1, wherein said renewable resource is selected from biomass gasification, photosynthesis, green hydrogen, blue hydrogen and combinations thereof; wherein said green hydrogen gas is generated using said CN electrical energy obtained from geothermal, hydroelectric, nuclear, photovoltaic, solar, wave, and wind power and combinations thereof; wherein said blue hydrogen gas is obtained by means of a Carbon Capture Sequestration and Usage (CCSU) process; and wherein said CN electrical energy is obtained from an electrical source using geothermal, hydroelectric, nuclear, photovoltaic, solar, wave, and wind power, and combinations thereof.

4. The method according to claim 1, wherein said hydrogen gas may be generated internally by means of a SMR (steam-methane reformer) unit operating on a supply of natural gas and using a CCSU process for capturing carbon oxides from the SMR unit.

5. The method according to claim 1, wherein any loss of electricity or heat due to any internal process is offset by the use of a said CN electrical energy; and wherein said CN component further includes any source of carbon-neutral carbon (CNC) that may be added to an LOHC feed during any process step in an amount sufficient to at least equal the quantity of carbon atoms being exhausted during an energy generation process.

6. The method according to claim 1 wherein said R-LOHC is substantially hydrogenated to contain at least 5 wt % labile hydrogen.

7. A method of operating a Carbon Neutral Energy Facility (CNEF) system to produce a carbon neutral (CN) fuel comprising CN hydrogen gas for distribution to a customer for use as a CN fuel in the following applications selected from an internal combustion engine, gas turbine, electrolysis cell, fuel cell, and combinations thereof; wherein said CN hydrogen gas is produced by means of using a carbon neutral carbon (CNC) content material, CN electricity derived from either an internal source within said CNEF system or from CN electricity derived from a utility grid.

8. The method of claim 7 wherein said CN hydrogen gas may be mixed with other sources of CN fuel; wherein said CN hydrogen gas may be combined with an added secondary carbon neutral (CN) component, wherein any loss of carbon content to the environment is offset by the addition of said secondary CN component in an amount sufficient to equal the said carbon content loss to the environment, for use in said electrolysis cell or said fuel cell; wherein said fuel cell is selected from a reversible fuel cell, PEMEC (proton-exchange membrane electrolysis cell), reversible PEMFC (proton-exchange membrane fuel cell), SOFC (solid oxide fuel cell), SOEC (solid oxide electrolytic cell), dual purpose proton-exchange membrane (PEC), alkaline fuel cell (AFC), phosphoric acid fuel cell (PAFC), molten carbonate fuel cell (MCFC), ceramic oxide fuel cell, and combinations thereof.

9. The method of claim 8 wherein said reversible fuel cell may utilize said CN hydrogen gas to generate carbon neutral (CN) electrical energy.

10. A method of operating a Carbon Neutral Energy Facility (CNEF) system to provide a renewable energy source in the form of internally generated carbon neutral (CN) electrical energy, comprising:
a) employing hydrogenated LOHC composition (R-LOHC) comprising a carbon neutral (CN) Liquid Organic Hydrocarbon composition (LOHC);
b) generating hydrogen gas by dehydrogenation of said R-LOHC using a hydrogen production unit and producing a partially or fully dehydrogenated LOHC (S-LOHC);
c) converting said generated hydrogen gas electrochemically in a fuel cell to generate said CN electrical energy; wherein said fuel cell is selected from a reversible fuel cell, PEMEC (proton-exchange membrane electrolysis cell), reversible PEMFC (proton-exchange membrane fuel cell), SOFC (solid oxide fuel cell), SOEC (solid oxide electrolytic cell), dual purpose proton-exchange membrane (PEC), alkaline fuel cell (AFC), phosphoric acid fuel cell (PAFC), molten carbonate fuel cell (MCFC), ceramic oxide fuel cell, and combinations thereof; and
d) transferring at least a portion of said CN electrical energy to a utility power grid;
wherein said hydrogen production unit is selected from a catalytic dehydrogenation unit, a reversible fuel cell, and combinations thereof;
wherein any loss of carbon dioxide to the environment is offset by the addition of a secondary CN component to said R-LOHC in an amount sufficient to equal the said carbon content loss to the environment;
wherein said secondary CN component is derived from a carbon-neutral carbon (CNC) sourced material;
wherein said LOHC is selected from a monocyclic molecule, a homocyclic molecule, polycyclic molecule and a heterocyclic molecule, and combinations thereof; wherein said S-LOHC consists of at least one of benzene, toluene, xylene, xylol, dimethylbenzene, trimethylbenzene, naphthalene, benzyl-toluene, 1-methyl perhydro indole, 1,2-perhydrodimethyl indole, perhydro dibenzyl toluene, and all fully hydrogenated isomers thereof, and combinations thereof; and wherein said R-LOHC consists of at least one partially or fully hydrogenated compound selected from cyclohexane, methyl cyclohexane, dimethyl cyclohexane, trimethyl cyclohexane, benzyl methyl cyclohexane, decalin, 1-methyl indole, 1,2-dimethyl indole, dibenzyl toluene, and all partially dehydrogenated isomers thereof, and combinations thereof.

11. The method according to claim 10, wherein a portion of said internally generated CN electrical energy is used to recharge a carbon-neutral (CN) storage system in the form of a liquid battery consisting of R-LOHC generated by conversion of S-LOHC using said internally generated CN electrical energy.

12. The method according to claim 10 wherein said R-LOHC is substantially hydrogenated to contain at least 5 wt % labile hydrogen.

13. A method of operating a Carbon Neutral Energy Facility (CNEF) system to provide a renewable energy source in the form of internally generated carbon neutral (CN) hydrogen gas comprising:

a) employing a carbon neutral (CN) Liquid Organic Hydrocarbon composition (LOHC) that is interconvertible between a hydrogenated LOHC composition (R-LOHC) and a partially or fully dehydrogenated LOHC composition (S-LOHC);

b) converting a portion of stored R-LOHC into S-LOHC to generate a first CN hydrogen gas, and using a source of carbon neutral (CN) electrical energy to simultaneously generate a second CN hydrogen gas with a fuel cell (FC); wherein said fuel cell is operated in reverse mode or electrolyzer mode to hydrolyze water; wherein said source of CN electrical energy is obtained from geothermal, hydroelectric, nuclear, photovoltaic, solar, wave, and wind power and combinations thereof; and c) storing said CN hydrogen gas for use internally or for transfer to a customer for use as a fuel in a hydrogen gas powered device selected from an internal combustion engine (ICE), gas turbine (GT), furnace, PEMF fuel cell, SOFC fuel cell, power generator, turbine, and the like, or alternatively for use in an industrial application to produce CN electricity with a reduced or carbon-neutral environmental footprint, wherein said LOHC is selected from a monocyclic molecule, a homocyclic molecule, polycyclic molecule and a heterocyclic molecule, and combinations thereof; wherein said S-LOHC consists of at least one of benzene, toluene, xylene, xylol, dimethylbenzene, trimethylbenzene, naphthalene, benzyl-toluene, 1-methyl perhydro indole, 1,2-perhydrodimethyl indole, perhydro dibenzyl toluene, and all fully hydrogenated isomers thereof, and combinations thereof; and wherein said R-LOHC consists of at least one partially or fully hydrogenated compound selected from cyclohexane, methyl cyclohexane, dimethyl cyclohexane, trimethyl cyclohexane, benzyl methyl cyclohexane, decalin, 1-methyl indole, 1,2-dimethyl indole, dibenzyl toluene, and all partially dehydrogenated isomers thereof, and combinations thereof.

14. The method of claim 13, further using a combustor to combust at least a portion of said CN hydrogen gas to generate heat while capturing at least a portion of the heat of combustion of said CN hydrogen gas by means of a heat exchanger to provide energy to said fuel cell to provide for the overall CN generation of said CN hydrogen gas.

* * * * *